United States Patent
Drouin et al.

(10) Patent No.: US 9,598,583 B2
(45) Date of Patent: Mar. 21, 2017

(54) PROCESSES FOR PREPARING TRIM BOARDS

(71) Applicant: Produits Matra Inc., Saint-Martin (CA)

(72) Inventors: Nicholas Drouin, St-Georges-de-Beauce (CA); Patrick Beaulieu, St-Georges-de-Beauce (CA); Jean-François Drouin, St-Georges-de-Beauce (CA)

(73) Assignee: PRODUITS MATRA INC., Saint-Martin (CA)

( * ) Notice: Subject to any disclaimer, the term of this patent is extended or adjusted under 35 U.S.C. 154(b) by 0 days.

(21) Appl. No.: 14/518,554

(22) Filed: Oct. 20, 2014

(65) Prior Publication Data
US 2015/0368476 A1  Dec. 24, 2015

Related U.S. Application Data

(60) Provisional application No. 62/015,419, filed on Jun. 21, 2014.

(51) Int. Cl.
C09D 5/00 (2006.01)
E04F 19/02 (2006.01)
E04F 19/04 (2006.01)

(52) U.S. Cl.
CPC ...... *C09D 5/002* (2013.01); *E04F 2019/0409* (2013.01)

(58) Field of Classification Search
CPC ............. B05F 7/06; C09D 5/002; E04F 19/02
See application file for complete search history.

(56) References Cited

U.S. PATENT DOCUMENTS 6,001,207 A      12/1999  Enlow et al.
6,245,141 B1 *   6/2001   Walker, Jr. ............. C09D 5/024
                                                        106/287.19
(Continued)

FOREIGN PATENT DOCUMENTS

WO         0166266        9/2001
WO   WO 0166266 A1 *      9/2001  ............. B05C 3/005

OTHER PUBLICATIONS

Atlanta Painting GreenWave Solutions' Atlanta Painting Division, Atlanta, "Tannin Bleed", 2009.
(Continued)

*Primary Examiner* — Dah-Wei D Yuan
*Assistant Examiner* — Kristen A Dagenais
(74) *Attorney, Agent, or Firm* — Bereskin & Parr LLP/S.E.N.C.R.L., s.r.l.

(57) ABSTRACT

There are provided a processes for manufacturing a trim board, as well as methods for reducing and/or preventing swelling in a finger jointed pine wood and methods for reducing and/or preventing migration of tannins in a finger jointed pine wood. These processes and methods comprise applying a first layer comprising a UV curable primer sealer on a front surface of the pine wood; heat drying the first layer in the presence of UV radiation so as to at least partially cure the first layer comprising the UV curable primer sealer; applying a second layer comprising the UV curable primer sealer on a back surface of the pine wood, the second layer being thinner than the first layer; and heat drying the second layer in the presence of UV radiation so as to at least partially cure the second layer comprising the UV curable primer sealer.

19 Claims, 2 Drawing Sheets

(56) References Cited

U.S. PATENT DOCUMENTS

| | | | |
|---|---|---|---|
| 6,383,652 B1* | 5/2002 | Templeton | B05D 7/08 427/372.2 |
| 6,531,223 B1 | 3/2003 | Rota et al. | |
| 7,553,549 B2 | 6/2009 | Liles et al. | |
| 7,838,446 B2 | 11/2010 | Jarck | |
| 7,867,622 B2 | 1/2011 | Endo et al. | |
| 2004/0071976 A1* | 4/2004 | Sobieski | B05D 5/00 428/422.8 |
| 2005/0069698 A1 | 3/2005 | Eubanks et al. | |
| 2006/0024480 A1* | 2/2006 | Lyons et al. | 428/172 |
| 2006/0177649 A1 | 8/2006 | Clark et al. | |
| 2006/0222829 A1* | 10/2006 | Dean | B05D 7/08 428/195.1 |
| 2007/0087213 A1 | 4/2007 | Robinson et al. | |
| 2007/0116732 A1 | 5/2007 | Goebel et al. | |
| 2008/0152829 A1* | 6/2008 | Dean | B05D 3/0209 427/494 |
| 2012/0244288 A1 | 9/2012 | Young et al. | |
| 2013/0280428 A1* | 10/2013 | Drouin et al. | 427/256 |

OTHER PUBLICATIONS

Walter Christiansen, "Extractive Bleeding: Not a Stain or Paint Failure", 2008.

\* cited by examiner

PROCESSES FOR PREPARING TRIM BOARDS

CROSS-REFERENCE TO RELATED APPLICATIONS

The present application claims priority on U.S. 62/015,419 filed on Jun. 21, 2014, which is hereby incorporated by reference in its entirety.

TECHNICAL FIELD

The present disclosure relates to improvements in the field of the production of trim boards. For example, it relates to processes that can be used for preparing trim boards such as those used as a finishing material for the outermost layer of a building.

BACKGROUND OF THE DISCLOSURE

In the production of trim boards several factors have to be considered in order to manufacture a good quality product at reasonable costs. For example, migration of wood tannins has to be avoided or reduced in order to avoid generating yellowish and/or brownish spots on the manufactured wood products. Moreover, the trim boards should have a surface as smooth as possible so as to hide jointing lines.

So far, several solutions have been proposed but there is still a need for providing a product and a manufacturing process that would provide an efficient and/or low cost solutions so as to overcome such drawbacks.

SUMMARY OF THE DISCLOSURE

According to one aspect, there is provided a process for manufacturing a trim board, the process comprising:

applying a first layer comprising a UV curable primer sealer on a front surface of the trim board;

heat drying the first layer in the presence of UV radiation so as to at least partially cure the first layer comprising the UV curable primer sealer;

applying a second layer comprising the UV curable primer sealer on a back surface of the trim board, the second layer being thinner than the first layer; and heat drying the second layer in the presence of UV radiation so as to at least partially cure the second layer comprising the UV curable primer sealer.

According to another aspect, there is provided a method for reducing and/or preventing migration of tannins in pine wood, the method comprising:

applying a first layer comprising a UV curable primer sealer on a front surface of the pine wood;

heat drying the first layer in the presence of UV radiation so as to at least partially cure the first layer comprising the UV curable primer sealer;

applying a second layer comprising the UV curable primer sealer on a back surface of the pine wood, the second layer being thinner than the first layer; and heat drying the second layer in the presence of UV radiation so as to at least partially cure the second layer comprising the UV curable primer sealer.

According to another aspect, there is provided a method for reducing and/or preventing swelling in a finger jointed pine wood product, the method comprising:

applying a first layer comprising a UV curable primer sealer on a front surface of the pine wood;

heat drying the first layer in the presence of UV radiation so as to at least partially cure the first layer comprising the UV curable primer sealer;

applying a second layer comprising the UV curable primer sealer on a back surface of the pine wood, the second layer being thinner than the first layer; and heat drying the second layer in the presence of UV radiation so as to at least partially cure the second layer comprising the UV curable primer sealer.

BRIEF DESCRIPTION OF DRAWINGS

In the following drawings, which represent by way of example only, various embodiments of the disclosure.

DETAILED DESCRIPTION OF VARIOUS EMBODIMENTS

Figure 1:
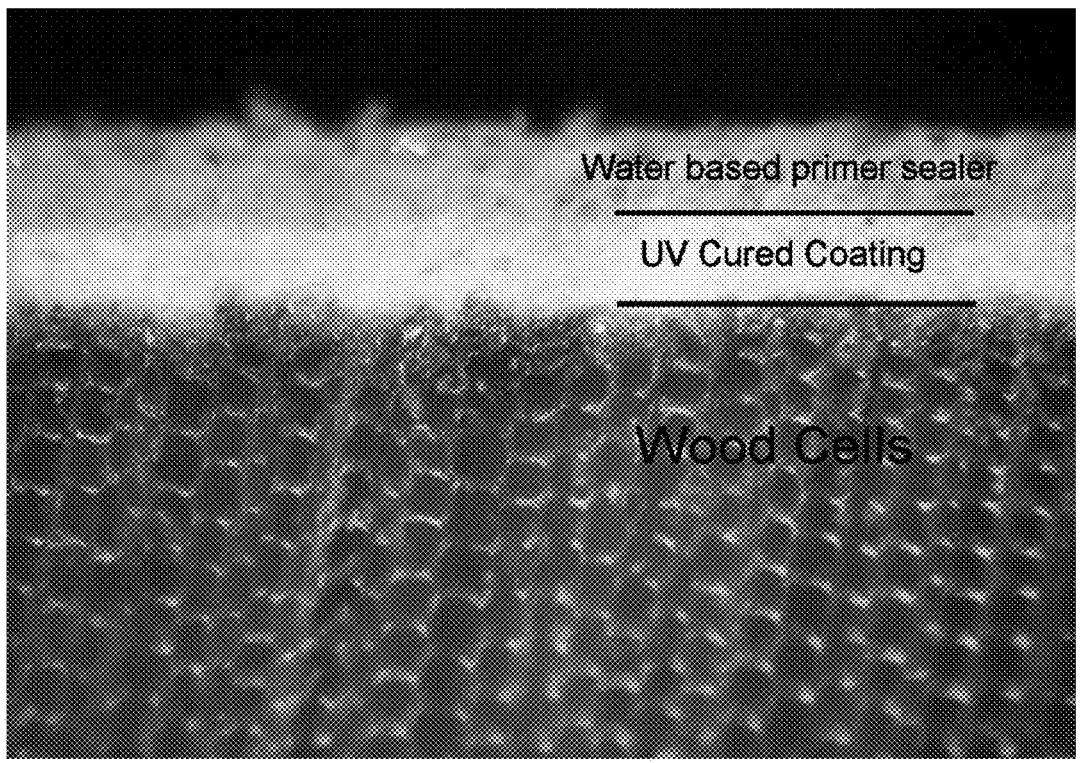
FIG. 1 is a microscopic picture of a cross-section of a trim board product obtained by an example of a process of the present disclosure.

The following non-limiting examples further illustrate the technology described in the present disclosure.

The processes and methods of the present disclosure can be applied to various wood products such as trim board.

The processes and methods of the present disclosure can be applied to various types of wood such as pine wood.

The processes and methods of the present disclosure can be applied to various types of finger jointed pine wood products such as trim boards, moldings For example, the pine wood can be white pine wood. White pine wood is also know as *Pinus strobus*, eastern white pine, northern white pine, soft pine, or Weymouth pine.

For example, the first layer comprising the UV curable primer sealer can have a thickness that is less than about 0.1 mm, less than about 0.09 mm, less than about 0.08 mm, less than about 0.07 mm, less than about 0.06 mm, less than about 0.05 mm or less than about 0.04 mm.

For example, the first layer comprising the UV curable primer sealer can have a thickness that is about 0.01 mm to about 0.25 mm, about 0.01 mm to about 0.15 mm, about 0.01 mm to about 0.1 mm, about 0.02 mm to about 0.1 mm, about 0.03 mm to about 0.09, about 0.03 mm to about 0.07 mm, or about 0.05 mm to about 0.08 mm.

For example, the second layer comprising the UV curable primer sealer can have a thickness that is less than about 0.05 mm, less than about 0.04 mm, less than about 0.03 mm, less than about 0.02 mm, less than about 0.01 mm, less than about 0.005 mm or less than about 0.004 mm.

For example, the second layer comprising the UV curable primer sealer can have a thickness that is about 0.006 mm to about 0.025 mm, about 0.01 mm to about 0.05 mm, 0.01 mm to about 0.04 mm, or about 0.01 mm to about 0.04 mm.

For example, the heat drying can be carried out by means of a forced air dryer.

For example, the heat drying can be carried out by means of a UV curing. or example, the heating can be carried out during a period of time of about 1 to about 60 seconds, about 1 to about 30 seconds, about 2 to about 45 seconds, about 3 to about 25 seconds, or about 5 to about 10 seconds.

For example, applying of the first layer and the second layer, heat drying these layers and cooling them can be carried out in a period of time of less than about 30 minutes, less than about 15 minutes, less than about 10 minutes, less than about 5 minutes or less than about 3 minutes.

For example, the UV curable primer sealer can have a VOCs content of less than about 400 g/L, less than about 300 g/L, less than about 200 g/L or less than about 100 g/L.

For example, the processes and methods can further comprise applying, on each of the first and second layers a layer comprising a water based primer sealer.

For example, the processes and methods can further comprise applying, on the first layer, a layer comprising a water based primer sealer.

For example, the processes and methods can further comprise applying, on the second layer, a layer comprising a water based primer sealer.

For example, the processes and methods can further comprise at least partially drying the layer of the water based primer sealer.

For example, the layer of the water based primer sealer can be dried by means of an infrared oven.

For example, the methods and processes can further comprise, before applying the layer comprising the water based primer sealer on the first layer, sanding the first layer.

For example, the methods and processes can further comprise, before applying the layer comprising the water based primer sealer on the second layer, sanding the second layer.

For example, the layer comprising the water based primer sealer on the first and/or second layer can have a thickness, before being dried, that is less than about 0.25 mm, that is less than about 0.2 mm, less than about 0.15 mm, less than about 0.12 mm, or less than about 0.1 mm. For example, such a thickness can be the thickness of the layer less than 30 seconds after being applied.

For example, the layer comprising the water based primer sealer the first and/or second layer can have a thickness that is about 0.02 mm to about 0.25 mm, about 0.03 mm to about 0.2 mm, about 0.05 mm to about 0.17 mm, about 0.07 mm to about 0.15 mm or about 0.07 mm to about 0.17 mm.

For example, drying of the first and/or second layer can be carried out in a UV oven.

For example, the first layer can be applied before or after the second layer.

For example, the layer of water based primer sealer can be applied firstly on the first layer and then the layer of water based primer sealer can be applied on the second layer. Alternatively, the layer of water based primer sealer can be applied firstly on the second layer and then the layer of water based primer sealer can be applied on the first layer.

For example, the first layer can be applied, then the second layer, then the water based primer sealer on the first layer and finally the water based primer sealer on the second layer.

For example, the first layer can be applied, then the second layer, then the water based primer sealer on the second layer and finally the water based primer sealer on the first layer.

For example, the first layer can be applied, then the water based primer sealer on the first layer, then the second layer, and finally the water based primer sealer on the second layer.

For example, the second layer can be applied, then the water based primer sealer on the second layer, then the first layer, and finally the water based primer sealer on the first layer.

For example, the second layer can be applied, then the first layer, then the water based primer sealer on the second layer, and finally the water based primer sealer on the first layer.

For example, the second layer can be applied, then the first layer, then the water based primer sealer on the first layer, and finally the water based primer sealer on the second layer.

For example, the second layer can be permeable to humidity and air.

For example, permeability of the second layer can allow for providing, to the trim board or the pine wood, an increased resistance to stresses caused by weather.

For example, the permeability of the second layer can allow for preventing and/or reducing flaws or cracks the back and/or front surface of the trim board or pine wood.

The following examples relate to examples of processes of the present disclosure.

A first layer (for example less than about 0.1 mm: values such as about 0.05 mm to about 0.08 mm) of a UV curable primer sealer can be applied on one surface of the trim board (for example the front surface i.e. the surface to be viewed when the trim board is installed, not the one facing a wall of a building for example). The trim board was made of pine wood (white pine wood). After applying the UV curable primer sealer, the trim boards were placed under UV radiation, such as in a UV oven, therefore allowing for the UV curable primer sealer to dry out and solidify. Since the UV curable primer sealer is composed mainly of "solid" elements, there is very little release of VOCs (volatile organic compounds). It was observed that the layer was rapidly dried and that no swelling occurred. Therefore, the thickness of the layer applied was substantially the same than the thickness of the layer after drying. Without wishing to be bound to such a theory, Applicants believe that such a layer is effective for preventing and/or reducing swelling when a further layer is applied (for example a layer of a water based product). This also allows for blocking and/or preventing migration or bleeding of tannins. After being disposed in the UV oven, the trim board was disposed for further drying and was ready for applying a second layer on the another surface (for example the back surface i.e. the one facing a wall of a building for example).

The UV curable primer sealer can be, for example PPG Raycron™, Sherwin Williams Ultra Cure™, or PPR D&M™.

Then, a second layer of the UV curable primer sealer was applied on the back surface of the trim board. This second layer has a thickness that is inferior to the thickness of the first layer. For example, the second layer (thinner than the first layer) can have a thickness of about 0.01 to about 0.04 mm. Such a layer was thick enough for preventing swelling of the wood grain and to provide a smooth finish. This allows to a purchaser to eventually use the back surface as a front surface if the front surface is damaged over time or during transportation or handling. The UV curable primer sealer is impervious to tannins as well as to humidity, air etc. The thickness applied on the back surface is voluntarily too thin, thereby creating micro-cracks in the UV curable primer sealer, and allowing for the wood to "breath". Thus, such a second layer that is effective for venting of the trim board since being at least partially permeable to air and humidity. Thus, such a permeability of the second layer allows for breathing of the trim board in the space (of about 15-20 mm) between the trim board and the interior of the wall of the building. This allows for preventing flaws or cracks that can appear on the back and/or front surface of the trim board over time due to repeated thermal cycles (hot/cold) and/or the change in humidity levels (from dry to humid). In brief, it allows for providing an increased resistance to stresses caused by weather. This second layer is then also treated in an UV oven as previously indicated for the first layer.

Then, a water based primer sealer can be applied on the second layer (back surface of the trim board). For example, the thickness of the layer of water based primer sealer can be about 0.07 mm to about 0.2 mm or about 0.07 mm to about 0.15 mm. Then, such a layer can be infrared dried during a few minutes in an InfraRed oven. The board is returned afterwards for the rest of the process. It was found that apart from the aesthetic function, this layer of water based primer on the back can serve to slow down the passage of the moisture while accepting it at the same time, since the application of the primer sealer on the front, can substantially totally block the passage of the humidity. The moisture is advantageously able to move somewhere to avoid possible flaws in the product such as separation of the paint into small bubbles or degradation of wood which has remained wet too long (rot). Later in the process, but on the back of the board, an indication to the user of which side is the back side can be printed (for example at high speed and for example in black ink). The printing can be repeated every 30, 40, 50, 60, 70 or 80 centimeters in such a way that even the short ends (cuts) are identified.

A layer comprising a water based primer sealer can be added over the first layer comprising the UV curable primer sealer. This layer can complete the smooth finish by filling in the last bit of roughness that may remain after application of the primer sealer. In addition to the aesthetic functions, this layer can help to prevent the trim boards from sticking together.

A light sanding between each layers can ensure the smoothest finish possible.

The water based primer sealer can be, for example, SW Fast-Drying™ primer, SW Multi-Purpose Latex™ primer, BM Fresh Start™ primer or BM Aura Waterborne Exterior™ paint.

As it can be seen on FIG. 1, the white pine trim board product obtained from the previous example comprises the following layers, added in the following order, on the top surface of the wood core portion: the layer comprising the UV curable primer sealer; and the layer comprising the water based primer sealer. The layers applied on the bottom surface of the trim board are not shown on FIG. 1.

Figure 2:
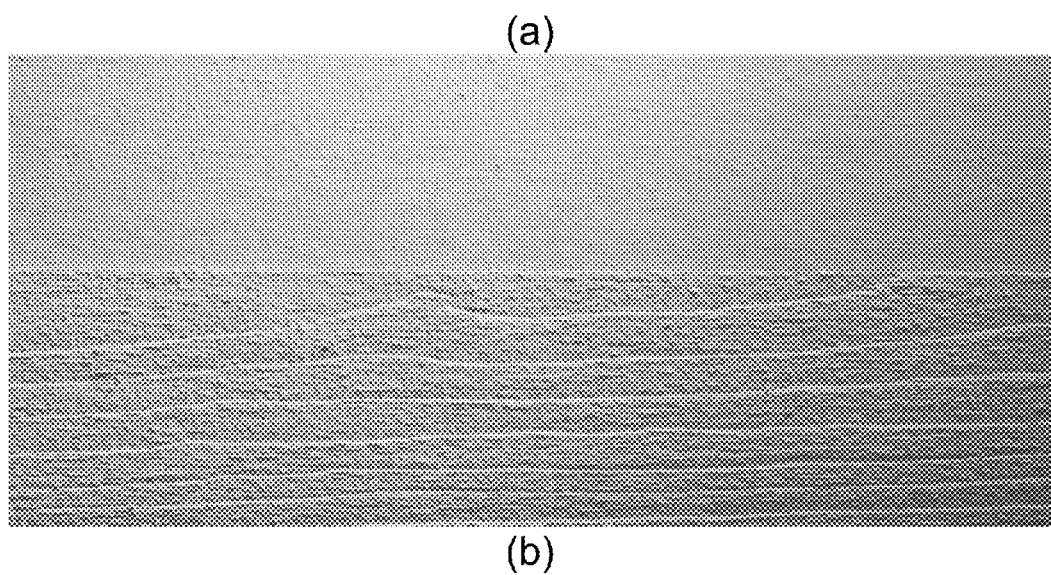
FIG. 2 is a picture showing the difference of smoothness of different sections of the top surface on a trim board: section (a) (top section) on which a layer of a UV curable primer sealer has been applied; and section (b) (bottom section) on which no such layer has been applied.

As it can be seen from FIG. 2, there is a significant difference between a section (a) (top section) of the white pine trim board on which the layer comprising the UV curable primer sealer was applied and a section (b) on which no such layer comprising the UV curable primer sealer. In fact, as it can be seen from these Figures, the section (b) for which the UV curable primer sealer is absent have an important swelling of the wood grain. In other words, the surface of the trim boards is a lot more smoother when the layer comprising the UV curable primer sealer is applied thereto (see section (a)). In order to obtain such differences, a masking tape was applied on the section (b) of each trim board and such a tape has been removed after the application of the UV curable primer sealer.

It was found that when using the processes and methods of the present disclosure, the following considerable advantages were encountered:
the processes and methods of the present disclosure allow for blocking and/or preventing migration of wood tannins. In fact, one of the drawbacks of using white pine trim boards is the wood tannins migration that will eventually occur thereby generating yellowish and/or brownish spots on wood. Moreover, the these processes and methods are effective for preventing reducing and/or preventing swelling in a finger jointed pine wood as well as for proving a smooth finish to a finger jointed pine wood.

Without wishing to be bound to such a theory, it is believed that the processes and methods of the present disclosure are effective to block and/or prevent migration of organic salts and/or extractable compounds found in wood such as pine wood (e.g. white pine wood). It was thus found that the methods and processes of the present disclosure are quite efficient for blocking and/or preventing the migration of tannins on white pine wood.

When using the processes and methods of the present disclosure, it was also possible to produce trim boards having an increased resistance to weather stresses caused by weather. It was also possible to produce such trim boards at low costs.

The person skilled in the art will understand that the processes of the present disclosure can be carried out in various orders. The example presented above is disclosed with a certain order in which certain products are applied but the technology disclosed in the present disclosure encompasses carrying out such processes and methods in all possible different orders.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A process for manufacturing a trim board, said process comprising:
    applying a first layer comprising an ultraviolet (UV) curable primer sealer on a front surface of said trim board, wherein said first layer comprising said UV curable primer sealer has a thickness that is 0.05 mm to 0.1 mm;
    heat drying said first layer in the presence of UV radiation so as to at least partially cure said first layer comprising said UV curable primer sealer;
    applying a second layer comprising said UV curable primer sealer on a back surface of said trim board, said second layer being thinner than said first layer, wherein said second layer comprising said UV curable primer sealer has a thickness that is 0.01 to 0.05 mm, creating micro-cracks in said UV curable primer sealer of said second layer and providing an increased resistance of said trim board to stresses caused by the weather; and
    heat drying said second layer in the presence of UV radiation so as to at least partially cure said second layer comprising said UV primer sealer.

2. The process of claim 1, wherein said UV curable primer sealer has a volatile organic compounds (VOCs) content of less than 100 g/L.

3. The process of claim 1, wherein said process further comprises applying, on said second layer, a layer comprising a water based primer.

4. The process of claim 3, wherein said layer comprising said water based primer has a thickness that is less than about 0.2 mm.

5. The process of claim 4, further comprising at least partially drying said layer of said water based primer applied on said second layer.

6. The process of claim 3, wherein said process further comprises applying, on said first layer, a layer comprising a water based primer.

7. The process of claim 6, wherein said layer comprising said water based primer has a thickness that is less than about 0.2 mm.

8. The process of claim 6, further comprising at least partially drying said layer of said water based primer applied on said first layer.

9. The process of claim 8, wherein said heat drying is carried out by means of UV radiation heat and/or infrared radiation heat.

10. The process of claim 3, wherein said process further comprises, before applying said layer comprising said water based primer on said second layer, sanding said second layer.

11. The process of claim 1, wherein said trim board is made of white pine wood.

12. A method for reducing and/or preventing migration of tannins in a finger jointed pine wood, said method comprising:
    applying a first layer comprising an ultraviolet (UV) curable primer sealer on a front surface of said pine wood, wherein said first layer comprising said UV curable primer sealer has a thickness that is 0.05 mm to 0.1 mm;
    heat drying said first layer in the presence of UV radiation so as to at least partially cure said first layer comprising said UV curable primer sealer;
    applying a second layer comprising said UV curable primer sealer on a back surface of said pine wood, said second layer being thinner than said first layer, wherein said second layer comprising said UV curable primer sealer has a thickness that is 0.01 to 0.05 mm, creating micro-cracks in said UV curable primer sealer of said second layer and providing an increased resistance of said trim board to stresses caused by the weather; and
    heat drying said second layer in the presence of UV radiation so as to at least partially cure said second layer comprising said UV curable sealer,
    reducing and/or preventing migration of tannins in said finger jointed pine wood.

13. A method for reducing and/or preventing swelling in a finger jointed pine wood, said method comprising:
    applying a first layer comprising an ultraviolet (UV) curable primer sealer on a front surface of said pine wood, wherein said first layer comprising said UV curable primer sealer has a thickness that is 0.05 mm to 0.1 mm;
    heat drying said first layer in the presence of UV radiation so as to at least partially cure said first layer comprising said UV curable primer sealer;
    applying a second layer comprising said UV curable primer sealer on a back surface of said pine wood, said second layer being thinner than said first layer, wherein said second layer comprising said UV curable primer sealer has a thickness that is 0.01 to 0.05 mm, creating micro-cracks in said UV curable primer sealer of said second layer and providing an increased resistance of said trim board to stresses caused by the weather; and
    heat drying said second layer in the presence of UV radiation so as to at least partially cure said second layer comprising said UV curable primer sealer,
    reducing and/or preventing swelling in said finger jointed pine wood.

14. The process of claim 12, wherein said UV curable primer sealer has a volatile organic compounds (VOCs) content of less than 100 g/L.

15. The process of claim 13, wherein said UV curable primer sealer has a volatile organic compounds (VOCs) content of less than 100 g/L.

16. The process of claim 12, wherein said process further comprises applying, on said second layer, a layer comprising a water based primer.

17. The process of claim 13, wherein said process further comprises applying, on said second layer, a layer comprising a water based primer.

18. The process of claim 16, wherein said process further comprises applying, on said first layer, a layer comprising a water based primer.

19. The process of claim 17, wherein said process further comprises applying, on said first layer, a layer comprising a water based primer.

\* \* \* \* \*